United States Patent [19]

Park

[11] Patent Number: 5,399,592
[45] Date of Patent: Mar. 21, 1995

[54] ETHYLENE POLYMER FOAMS BLOWN WITH ISOBUTANE AND 1,1,1-TRIFLUOROETHANE OR 1,1,1,2-TETRAFLUOROETHANE AND A PROCESS FOR MAKING

[75] Inventor: Chung P. Park, Pickerington, Ohio

[73] Assignee: The Dow Chemical Company, Midland, Mich.

[21] Appl. No.: 284,723

[22] Filed: Aug. 2, 1994

Related U.S. Application Data

[63] Continuation-in-part of Ser. No. 252,152, Jun. 1, 1994, abandoned, which is a continuation of Ser. No. 177,802, Jan. 6, 1994, abandoned, which is a continuation-in-part of Ser. No. 90,845, Jul. 12, 1993, abandoned.

[51] Int. Cl.6 .................................................. C08J 9/14
[52] U.S. Cl. ........................................ 521/79; 521/98; 521/143; 521/910; 264/53; 264/DIG. 5
[58] Field of Search ............. 264/53, DIG. 5; 521/79, 521/98, 143, 910

[56] References Cited

U.S. PATENT DOCUMENTS

| | | | |
|---|---|---|---|
| 3,668,155 | 6/1972 | Raley, Jr. | 521/98 |
| 4,086,192 | 4/1978 | Raley, Jr. | 521/98 |
| 4,640,933 | 2/1987 | Park | 521/94 |
| 5,149,473 | 9/1992 | LeDuc | 521/98 |
| 5,210,105 | 5/1993 | Paquet et al. | 521/99 |
| 5,244,928 | 9/1993 | Smith et al. | 521/146 |

FOREIGN PATENT DOCUMENTS

| | | | |
|---|---|---|---|
| 8372618331 | 12/1981 | Japan . | |
| 9103366305 | 5/1989 | Japan . | |
| 2-08370211 | 5/1990 | Japan | C08J 23/04 |

*Primary Examiner*—Morton Foelak
*Attorney, Agent, or Firm*—J. Robert Dean, Jr.

[57] ABSTRACT

Disclosed is an ethylene polymer foam structure having enhanced processing and physical properties. The foam structure comprises an ethylenic polymer material and a blowing agent. The blowing agent has a primary blowing agent of isobutane and a secondary blowing agent of 1,1,1-trifluoroethane, 1,1,1,2-tetrafluoroethane, or a blend of them. Further disclosed is a process for making the foam structure.

7 Claims, 1 Drawing Sheet

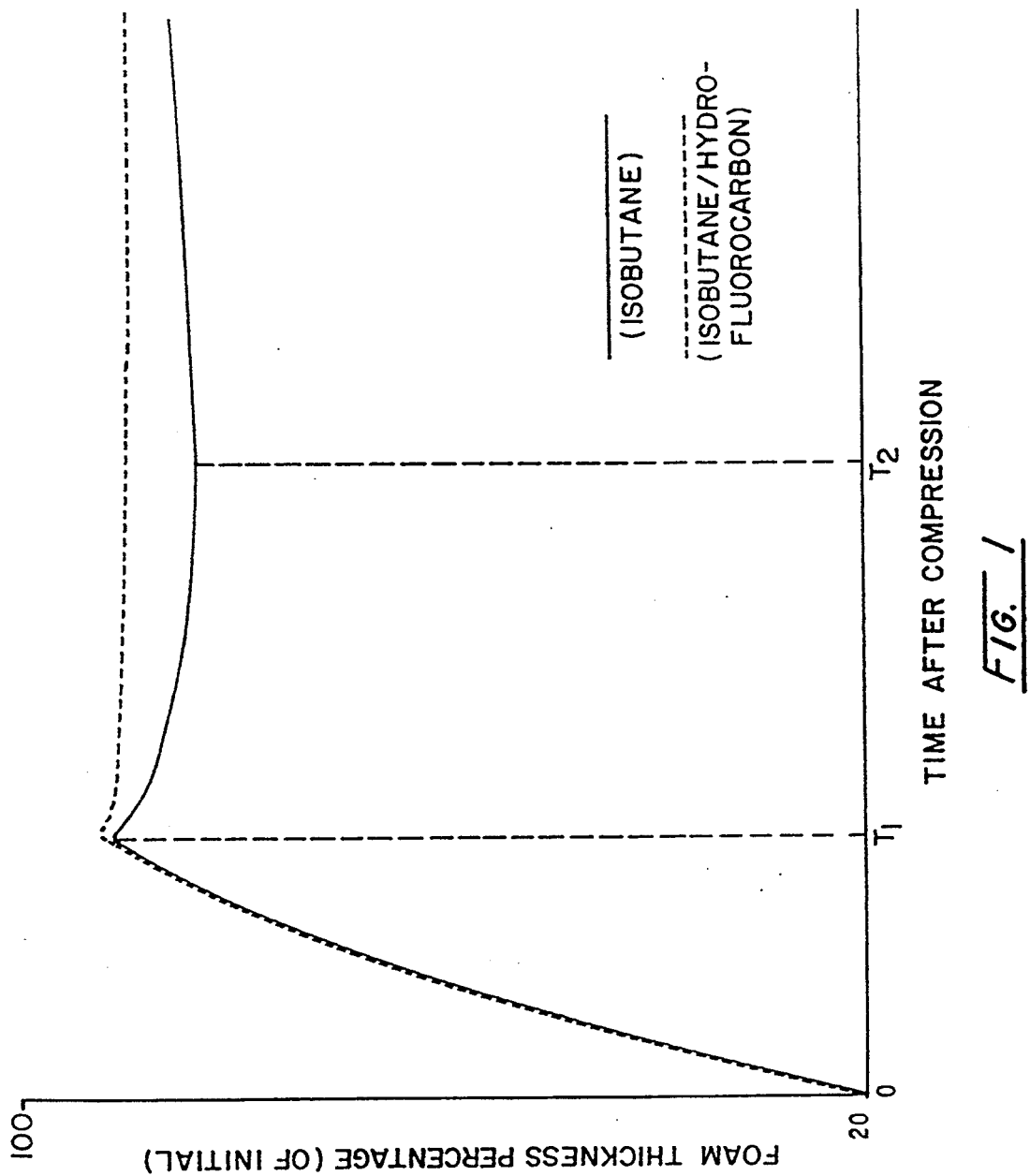

ETHYLENE POLYMER FOAMS BLOWN WITH ISOBUTANE AND 1,1,1-TRIFLUOROETHANE OR 1,1,1,2-TETRAFLUOROETHANE AND A PROCESS FOR MAKING

CROSS-REFERENCE TO RELATED APPLICATION

This application is a continuation-in-part of application Ser. No. 08/252,152, filed Jun. 1, 1994, now abandoned, which is a continuation of application Ser. No. 08/177,802, filed Jan. 6, 1994, now abandoned, which is a continuation-in-part of application Ser. No. 08/090,845, filed Jul. 12, 1993, now abandoned.

BACKGROUND OF THE INVENTION

This invention relates to an ethylene polymer foam structure having enhanced processability and physical properties. The invention further relates to a process for making the foam structure.

Isobutane has become a preferred blowing agent for making ethylene polymer foam structures because of its zero ozone depletion potential and relatively high degree of processability and foamability, which can result in end products having generally desirable physical properties. A concern with using isobutane is that it is a volatile organic compound, which may be subject to environmental regulation. Another concern is that under some conditions, sometimes incomplete or inconsistent compressive recovery can be observed in end product foam structures at certain critical points in time in the product life cycle.

A means of reducing the volatile organic content of a blowing agent containing isobutane is to replace part or all of the isobutane with a hydrofluorocarbon, which may not cause the same measure of environmental concern. Suitable hydrofluorocarbons include 1,1,1-trifluoroethane (HFC-143a) and 1,1,1,2-tetrafluoroethane (HFC-134a).

Replacing isobutane with hydrofluorocarbons can present processing and extrusion problems because of the relatively low solubility of hydrofluorocarbons in melts of ethylene polymers. The processing and extrusion problems would be expected to take the form of a relatively narrow range or "window" of foaming temperatures or less than desirable physical properties in the end product. Undesirable physical properties can include poor skin quality, small cell size, high foam density, and small cross-section.

Foam structures blown with a blowing agent comprised entirely of isobutane sometimes do not fully recover after compression, to which the foam structures are often subjected to during die cutting. After compression and release from compression, foam structures blown entirely with isobutane recover a substantial proportion (i.e. about 88–95 percent by volume or thickness) of their initial volume prior to compression, but may then shrink to some degree (i.e. about 3–10 percent by volume or thickness) for an extended period of time before expanding and re-gaining a substantial proportion of the initial volume. This temporary shrinkage is a problem for cushion packaging end users or customers because the shrinkage typically occurs while the foam structure is being used as cushion packaging. The shrinkage results in an undesirable loose fit between the packaging material and the article or articles being packaged.

It would be desirable to have an ethylene polymer foam structure and process for making wherein the use of isobutane as a blowing agent is reduced. It would further be desirable to make a foam structure under a relatively wide range of processing conditions with desirable foam physical properties. It would further be desirable to make such a foam structure with improved compressive recovery.

SUMMARY OF THE INVENTION

According to the present invention, there is an ethylene polymer foam structure comprising an ethylenic polymer material and a blowing agent. The ethylenic polymer material comprises greater than 50 percent by weight ethylenic monomeric units. The blowing agent comprises a primary blowing agent of isobutane and a secondary blowing agent selected from the group consisting of 1,1,1-trifluoroethane (HFC-143a), 1,1,1,2-tetrafluoroethane (HFC-134a), and a blend of the foregoing. A surprising and unexpected feature of this invention was that a blowing agent of isobutane and any of the above-described hydrofluorocarbons would substantially maintain the processability of a blowing agent comprised solely or entirely of isobutane. Further surprising and unexpected was that desirable physical properties were likewise maintained to an acceptable or substantial degree. Another surprising and unexpected feature was enhanced compressive recovery over a corresponding foam structure blown solely or entirely with isobutane.

Further according to the present invention, there is a process for making an ethylenic polymer foam structure. The process comprises: a) heating an ethylenic polymer material to form a melt polymer material; b) incorporating into the melt polymer material at an elevated pressure a blowing agent to form a foamable gel; and c) expanding the foamable gel at a lower pressure to form a foam structure. The ethylenic polymer material and the blowing agent are as described above.

BRIEF DESCRIPTION OF THE DRAWINGS

The novel features of the present invention and the context within which they are set will be better understood upon viewing the following specification together with the drawings.

FIG. 1 is a view of a representational comparative plot of the general compressive recovery behavior of ethylene polymer foam structures blown with blowing agents of isobutane and isobutane/hydrofluorocarbon.

DETAILED DESCRIPTION

The present foam structure comprises an ethylenic polymer material. Suitable ethylenic polymer materials include ethylenic homopolymers and copolymers of ethylenic compounds and copolymerizable ethylenically unsaturated comonomers. The ethylenic polymer material may further include minor proportions of non-ethylenic polymers. The ethylenic polymer material may be comprised solely of one or more ethylenic homopolymers, one or more ethylenic copolymers, a blend of one or more of each of ethylenic homopolymers and copolymers, or blends of any of the foregoing with a non-ethylenic polymer. Regardless of composition, the ethylenic polymer material comprises greater than 50 and preferably greater than 70 weight percent of ethylenic monomeric units. Most preferably, the ethylenic polymer material is comprised completely or entirely of ethylenic monomeric units. Most preferred ethylenic polymers are polyethylene homopolymers. Polyethylenes may be of the high, medium, low, linear low, or ultra-low density type. Most preferred are low density polyethylenes. The polyethylenes may be linear, branched, or lightly cross-linked.

Suitable ethylenic copolymers may be comprised of ethylenic monomeric units and minor amounts, preferably 20 percent or less by weight, of a monoethylenically unsaturated monomeric unit or units copolymerizable therewith. Suitable comonomers include $C_{1-4}$ alkyl acids and esters, ionomeric derivatives, $C_{2-6}$ dienes, and $C_{3-9}$ olefins. Examples of suitable comonomers include acrylic acid, itaconic acid, maleic acid, methacrylic acid, ethacrylic acid, methyl acrylate, methyl methacrylate, ethyl acrylate, vinyl acetate, carbon monoxide, maleic anhydride, acrylonitrile, propylene, isobutylene, and butadiene.

The present ethylene polymer foam is generally prepared by heating an ethylenic polymer material to form a plasticized or melt polymer material, incorporating therein a blowing agent to form a foamable gel, and extruding the gel through a die to form the foam product. Prior to mixing with the blowing agent, the polymer material is heated to a temperature at or above its glass transition temperature or melting point. The blowing agent may be incorporated or mixed into the melt polymer material by any means known in the art such as with an extruder, mixer, blender, or the like. The blowing agent is mixed with the melt polymer material at an elevated pressure sufficient to prevent substantial expansion of the melt polymer material and to generally disperse the blowing agent homogeneously therein. Optionally, a nucleator may be blended in the polymer melt or dry blended with the polymer material prior to plasticizing or melting. The foamable gel is typically cooled to a lower temperature to optimize physical characteristics of the foam structure. The gel may be cooled in the extruder or other mixing device or in separate coolers. The gel is then extruded or conveyed through a die of desired shape to a zone of reduced or lower pressure to form the foam structure. The zone of lower pressure is at a pressure lower than that in which the foamable gel is maintained prior to extrusion through the die. The lower pressure may be superatmospheric or subatmospheric (vacuum or evacuated), but is preferably at an atmospheric level.

The blowing agent comprises isobutane and HFC-143a, and HFC-134a, or blends of HFC-143a and HFC-134a. The blowing agent preferably comprises a primary blowing agent of about 5 to about 95, more preferably about 15 to about 85, and most preferably about 25 to about 75 weight percent isobutane based upon the total weight of the blowing agent. The blowing agent further comprises a secondary blowing agent preferably of about 95 to about 5, more preferably about 85 to about 15, and most preferably about 75 to about 25 weight percent selected from the group consisting of HFC-143a, and HFC-134a, and blends of the foregoing. Most preferred blowing agents are those comprised entirely of isobutane and one or more of the hydrofluorocarbons.

Surprisingly, certain hydrofluorocarbons can be used in a blowing agent with isobutane and maintain at least acceptable levels of certain desirable processing and physical properties in end product foam structures heretofore obtainable only with isobutane. Preferably, desirable processing and physical properties are substantially maintained with the use of a hydrofluorocarbon/isobutane blowing agent compared to a blowing agent comprised entirely of isobutane on an equimolar basis (the total number of moles of isobutane and hydrofluorocarbon in the blowing agent being equal to the number of moles of isobutane in a corresponding blowing agent comprising entirely isobutane). Which processing and physical properties are desirable will vary according to the characteristics of a desired end product foam structure, and the hydrofluorocarbon/isobutane blowing agent need not offer advantageous performance in every property. Processing properties important in most conventional applications include foaming temperature range or window and cross-sectional size. Physical properties important in most conventional applications include skin quality, cell size, density, open-cell content, dimensional stability, and compressive recovery.

Further surprisingly, the use of the hydrofluorocarbon with isobutane as a blowing agent resulted in enhanced compressive recovery in end product foam structures compared to foam structures produced solely with isobutane on an equimolar basis. Enhanced compressive recovery provides greater toughness and better cushioning performance. Specifically, the use of hydrofluorocarbon with isobutane provides a foam structure with more consistent dimensional stability after compression than with isobutane alone.

FIG. 1 is a representation of the general compressive recovery behavior sometimes exhibited in foam structures blown entirely with isobutane as well as the general compressive recovery behavior of foam structures of the present invention blown with isobutane and hydrofluorocarbon. FIG. 1 is representational, and does not necessarily correspond exactly to particular foam structures blown with or without hydrofluorocarbon.

FIG. 1 illustrates compressive recovery behavior sometimes exhibited by foam structures blown entirely with isobutane. Dimensional stability is represented as a function of foam thickness as a percentage of the initial thickness versus time. After such foam structures are compressed to a substantial degree, such as about 80 percent of initial volume, the compression is released to allow re-expansion of the foam structure to a temporary volume ratio peak at time $T_1$. $T_1$ will vary according to foam structure composition and process conditions, but typically ranges from 1 hour to 3 days. After $T_1$ for reasons unknown, the foam structures expanded with isobutane may continue to shrink by about 3 to 10 percent in volume until a minimum is reached at $T_2$. $T_2$ will vary according to foam composition and thickness, but typically ranges from 2 weeks to 5 weeks. After $T_2$, foam thickness slowly recovers, but may take months to recover.

FIG. 1 further represents the general compressive recovery behavior of foam structures of the present invention blown with isobutane and hydrofluorocarbon. As shown in FIG. 1, recovery after release from compression generally follows that of corresponding structures blown solely with isobutane until about time $T_1$. Foam structures of the present invention typically exhibit about the same or greater peak recovery at $T_1$ than corresponding foam structures blown solely with isobutane. The present structure may not shrink at all or may shrink to a lesser degree, i.e. about 3 percent or less.

Blowing agents useful in small amounts (about 20 weight percent or less based upon the total weight of the blowing agent) as co-blowing agents with isobutane and HFC-143a and HFC-134a include inorganic agents, organic blowing agents and chemical blowing agents. Suitable inorganic blowing agents include carbon dioxide, nitrogen, argon water, air, nitrogen, and helium. Organic blowing agents include aliphatic hydrocarbons having 1-9 carbon atoms, aliphatic alcohols having 1-3 carbon atoms, and fully and partially halogenated aliphatic hydrocarbons having 1-4 carbon atoms. Aliphatic hydrocarbons include methane, ethane, propane, n-butane, n-pentane, isopentane, neopentane, and the like. Aliphatic alcohols include methanol, ethanol, n-propanol, and isopropanol. Fully and partially halogenated aliphatic hydrocarbons include fluorocarbons, chlorocarbons, and chlorofluorocarbons. Examples of fluorocarbons include methyl fluoride, perfluoromethane, ethyl fluoride, pentafluoroethane, difluoromethane, perfluoroethane, 2,2-difluoropropane, 1,1,1-trifluoropropane, perfluoropropane, dichloropropane, difluoropropane, 1,1-difluoroethane (HFC-152a), perfluorobutane, perfluorocyclobutane. Partially halogenated chlorocarbons and chlorofluorocarbons for use in this invention include methyl chloride, methylene chloride, ethyl chloride, 1,1,1-trichloroethane, 1,1-dichloro-1-fluoroethane (HCFC-141b), 1-chloro-1,1-difluoroethane (HCFC-142b), chlorodifluoromethane (HCFC-22), 1,1-dichloro-2,2,2-trifluoroethane (HCFC-123) and 1-chloro-1,2,2,2tetrafluoroethane (HCFC-124). Fully halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane. Chemical blowing agents include azodicarbonamide, azodiisobutyronitrile, benzenesulfonhydrazide, 4,4-oxybenzene sulfonyl-semicarbazide, p-toluene sulfonyl semi-carbazide, barium azodicarboxylate, N,N'-dimethyl-N,N'-dinitrosoterephthalamide, and trihydrazino triazine.

The amount of blowing agent incorporated into the polymer melt material to make a foam-forming polymer gel is from about 0.2 to about 5.0, preferably from about 0.5 to about 3.0, and most preferably from about 1.0 to 2.50 gram-moles per kilogram of polymer (mpk).

The present foam structure may be crosslinked or non-crosslinked, but is preferably substantially non-crosslinked or substantially free of crosslinking. Substantially non-crosslinked is inclusive however, of the slight degree of crosslinking which may occur naturally without the use of crosslinking agents or radiation.

The present foam structure has a density of about 200 or less, more preferably about 100 or less, and most preferably about 10 to about 70 kilograms per cubic meter according to ASTM D-1622. The foam has an average cell size of about 0.1 to about 5.0 preferably about 0.5 to about 3.0, and most preferably from about 0.2 to about 1.8 millimeters according to ASTM D3576-77.

The foam component of the present foam structure may be closed cell or open cell. Open-cell content may vary from 0 to 100 percent according to ASTM D2856-A. Preferably, the present foam is about 50 percent or less open-cell and most preferably about 20 percent or less according to ASTM D2856-A.

The present foam structure exhibits excellent dimensional stability. Preferred foams recover 80 or more percent of initial volume within a month with initial volume being measured within 30 seconds after extrusion. Stability control agents may be incorporated to enhance dimensional stability. Suitable agents include those known in the art, such as $C_{12-22}$ fatty acid amides, amines, and esters. Preferred agents include stearyl stearamide and glycerol monostearate.

Various additives may be incorporated in the present foam structure such as inorganic fillers, pigments, antioxidants, acid scavengers, ultraviolet absorbers, flame retardants, processing aids, extrusion aids, and the like.

A nucleating agent may be added to control cell size if desired. Preferred nucleating agents include inorganic substances such as calcium carbonate, talc, clay, titanium oxide, silica, barium sulfate, diatomaceous earth, mixtures of citric acid and sodium bicarbonate, and the like. The amount of nucleating agent employed may range from about 0.01 to about 5 parts by weight per hundred parts by weight of a polymer resin. The preferred range is from 0.1 to about 3 parts by weight.

The present foam may .take the form of sheet, rods, tubes, planks, or coalesced-strand planks.

The following are examples of the present invention, and are not to be construed as limiting. Unless otherwise indicated, all percentages, parts, or proportions are by weight.

EXAMPLES

While embodiments of the foam structure and the process of the present invention have been shown with regard to specific details, it will be appreciated that depending upon the manufacturing process and the manufacturer's desires, the present invention may be modified by various changes while still being fairly within the scope of the novel teachings and principles herein set forth.

Ethylene polymer foam structures of the present invention are made in Examples 1, 2, and 3 according to the process of the present invention.

Example 1

In this example, 75/25 and 50/50 by mole mixtures of isobutane and HFC-143a were compared with 100 percent isobutane blowing agent in the dimensional stability of both as-extruded foams and compressed foams.

The equipment used was a 38 mm (1½ inch) screw type extruder having additional zones of mixing and cooling at the end of sequential zones of feeding, metering, and mixing. Blowing agent injected between the metering and mixing zones. A rectangular die orifice was provided at the end of the cooling zone. The die gap was adjustable, and its width was fixed at 6.35 mm (0.25 inch).

A granular polyethylene of 1.8 melt index (at 190° C./2.16 kg) and 0.923 g/cc density was preblended with a concentrate of stearyl stearamide (SS) so that the effective SS level was 1.0 parts per hundred (pph) based upon the weight of the polyethylene. The blend was fed to the extruder, and extruded at a uniform rate of 6.8 kilograms/hour (kgs/hr) (15 pounds/hour (lbs/hr)). The temperatures maintained at the extruder zones were 163° C. at the feeding zone, 185° C. at the transition zone, 193° C. at the melting zone, 204° C. at the metering zone, and 174° C. at the mixing zone. A premixed blowing agent was uniformly injected into the injection port at a predetermined rate so that the blowing agent level was approximately 1.3 g-moles per kilogram of polymer (mpk). The temperature of cooling zone was gradually reduced to cool the polymer/blowing agent mixture (gel) to an optimum foaming temperature. The optimum foaming temperature ranged from 107° C. to 110° C. The die temperature was maintained at 107° C. The die opening was adjusted to achieve a good foam strand free from prefoaming.

The processability data of the blowing agent formulations are summarized in Table 1a. Good foams having low densities were achieved from the mixed blowing agents as well as from isobutane blowing agent. At 50 mole percent HFC-143a, the cell size and the foam cross-sectional size became smaller.

The foams were subjected to two types of dimensional stability tests. One was a traditional dimensional stability test of monitoring the volume of a foam specimen as a function of foam age. The other was monitoring the foam dimensional stability after compression.

The dimensional stability of uncompressed foam was determined as follows. Two approximately 4 inch-long specimens were cut from their foam strands. Within about 30 seconds, their initial weights and volumes were determined. The weights and volumes of the foam specimens were periodically measured thereafter.

The dimensional stability after compression was determined as a function of the foam age. The test was run with foams aged at an ambient temperature (22° C.) for 1 hour, 1 day, 3 days, and 7 days, respectively. In addition, the test was run with foams aged at a cold temperature of 27° F. (−5° C.) for 1 day in order to simulate a winter condition. The cold-aged foam specimen was left at an ambient temperature after it was compressed. Approximately 4 inch-long specimens were cut out of foam strands and their volumes were measured. The foam specimens were then compressed to approximately 20 percent of their original thickness (80 percent compressive deflection) using a hand press and the pressure was quickly relieved. The volumes of the foam specimens were periodically measured.

The use of HFC-143a with isobutane improved foam dimensional stability over that blown with only isobutane. (Test No. 1.1) The foam expanded with a 50/50 by mole mixture of isobutane/HFC-143a 143a exhibited an excellent dimensional stability.

The more dramatic effect of HFC-143a was seen in Table 1c, where the dimensional stability after compression is shown. When compressed relatively fresh, one hour after extrusion, the foam expanded with 100 percent isobutane shrank as much as 19 percent during subsequent aging. The foams expanded with isobutane/HFC-143a mixed blowing agents performed far better. Aging was shown to improve the dimensional stability after compression. When compressed after aging for one day in an ambient temperature, the isobutane-blown foam shrank significantly less than when it was fresh. Aging at 23° F. for one day did not improve the foam sufficiently for compression stability. Aging the foam for three days at an ambient temperature provided a satisfactory dimensional stability.

Reducing the aging requirement represents a significant improvement in the commercial manufacture of foam by avoiding long storage periods. The aging time of about 3 days required for this foam corresponds to 104 days for a 2 inch-thick foam. Such a long quarantine time is costly. Mixed blowing agents dramatically shorten the required aging time.

TABLE 1a

| Test No. | Blowing Agent | | Foaming | | | Foam Density | | Cell Size (mm)[8] | Cross-Section | |
|---|---|---|---|---|---|---|---|---|---|---|
| | Type[1] | Ratio (mol)[2] | Level (mph)[3] | Temp. (°C.)[4] | Die Gap (mil)[5] | Fresh[6] pcf (kg/m³) | Aged[7] pcf (kg/m³) | | Width[9] inch (cm) | Thick[10] inch (cm) |
| 1.1* | iC4 | 100 | 0.13 | 110 | 50 | 2.33 (37.3) | 2.40 (38.4) | 1.35 | 1.12 (2.85) | 0.35 (0.89) |
| 1.2 | iC4/R-143a | 75/25 | 0.13 | 108 | 52 | 2.25 (36.0) | 2.25 (36.0) | 1.35 | 1.18 (3.00) | 0.38 (0.97) |
| 1.3 | iC4/R-143a | 50/50 | 0.13 | 107 | 54 | 2.54 (40.6) | 2.48 (39.7) | 0.77 | 1.08 (2.74) | 0.29 (0.74) |

*Not an example of this invention
[1]iC4 = isobutane; R-143a = HFC-143a
[2]Mixture ratio of blowing agent by mole
[3]G-moles of blowing agent mixed in per one hundred grams of polymer
[4]The temperature of foaming gel in degrees Celsius
[5]The height of the die opening in mils
[6,7]Densities of fresh and aged (2 weeks) foam body in pounds per cubic foot (kilograms per cubic meter (kg/m³))
[8]Cell size in millimeters determined per ASTM D3576
[9,10]Width and thickness of foam body in inches (centimeters (cm))

TABLE 1b

| Test No. | iC4/143a Mol Ratio[1] | Dimensional Stability[2] | | | | | | | | | | |
|---|---|---|---|---|---|---|---|---|---|---|---|---|
| | | 15 min | 30 min | 1 hr | 2 hr | 3 hr | 1 day | 3 day | 4 day | 5 day | 6 day | 1 wk | 2 wk |
| 1.1 | 100/0 | 95 | 94 | 92 | 90 | 89 | 86 | 88 | 88 | 88 | 89 | 89 | 91 |
| 1.2 | 75/25 | 96 | 95 | 94 | 92 | 91 | 90 | 91 | 91 | 91 | 92 | 92 | 94 |
| 1.3 | 50/50 | 99 | 99 | 99 | 99 | — | 99 | 99 | 99 | 99 | 99 | 99 | 99 |

[1]The molar ratio of isobutane and HFC-143a
[2]Foam volume as a percentage of the initial determined within 30 seconds after extrusion after aging the specified time TABLE 1c

| Test No. | iC4/143a Ratio[1] | Foam Volume as a Percentage of the Initial[2] | | | | | | | | | | |
|---|---|---|---|---|---|---|---|---|---|---|---|---|
| | | 5 min | 1 hr | 2 hr | 3 hr | 1 day | 2 day | 3 day | 4 day | 5 day | 6 day | 1 wk | 2 wk |
| Compression after 1 hour aging | | | | | | | | | | | | | |
| 1.1 | 100/0 | 96 | 93 | 91 | — | 82 | — | 81 | 82 | 83 | 85 | 84 | 89 |
| 1.2 | 75/25 | 97 | 96 | 95 | — | 89 | — | 91 | 91 | 92 | 92 | 92 | 96 |
| 1.3 | 50/50 | 98 | 99 | — | — | 98 | — | 99 | 98 | 98 | 98 | 98 | 98 |

TABLE 1c-continued

| Test No. | iC4/143a Ratio[1] | Foam Volume as a Percentage of the Initial[2] | | | | | | | | | | |
|---|---|---|---|---|---|---|---|---|---|---|---|---|
| | | 5 min | 1 hr | 2 hr | 3 hr | 1 day | 2 day | 3 day | 4 day | 5 day | 6 day | 1 wk | 2 wk |
| Compression after 1 day aging | | | | | | | | | | | | | |
| 1.1 | 100/0 | 96 | 97 | — | 96 | — | 93 | 93 | 93 | 93 | 93 | 95 | 97 |
| 1.2 | 75/25 | 98 | 98 | — | 98 | — | 98 | 98 | 98 | 98 | 98 | 100 | 101 |
| 1.3 | 50/50 | 99 | 100 | — | 100 | — | 100 | 100 | 100 | 100 | 100 | 101 | 100 |
| Compression after 3 days aging | | | | | | | | | | | | | |
| 1.1 | 100/0 | 96 | 98 | 99 | — | 96 | 96 | 96 | 97 | 99 | 99 | 99 | 100 |
| 1.2 | 75/25 | 99 | 99 | 100 | — | 99 | 99 | 99 | 99 | 100 | 100 | 100 | 100 |
| 1.3 | 50/50 | 100 | 100 | 100 | — | 99 | 99 | 99 | 99 | 100 | 99 | 99 | 99 |
| Compression after 7 days aging | | | | | | | | | | | | | |
| 1.1 | 100/0 | 100 | 100 | 100 | 99 | 100 | 101 | — | 102 | — | — | 103 | 102 |
| 1.2 | 75/25 | 99 | 100 | 99 | 99 | 100 | 101 | — | 101 | — | — | 101 | 101 |
| 1.3 | 50/50 | 99 | 100 | 100 | 99 | 99 | 99 | — | 99 | — | — | 100 | 100 |
| Compression after 1 day aging at 23° F. | | | | | | | | | | | | | |
| 1.1 | 100/0 | 98 | 96 | — | 94 | — | 86 | 86 | 87 | 87 | 88 | 91 | 94 |
| 1.2 | 75/25 | 99 | 97 | — | 97 | — | 92 | 92 | 93 | 94 | 94 | 95 | 99 |
| 1.3 | 50/50 | 100 | 100 | — | 100 | — | 100 | 100 | 100 | 100 | 100 | 100 | 100 |

[1]The molar ratio of isobutane and HFC-143a
[2]The foam volume as a percentage of the initial at the specified time after compression Example 2

Foams were produced by substantially the same apparatus and procedure of Example 1. The polyethylene of Example 1 was expanded with isobutane/HFC-134a mixtures as well as isobutane and isobutane/HFC-143a mixtures. The level of the stability control agent (stearyl stearamide) was raised to 1.5 pph.

As shown in Table 2a, both isobutane/HFC-143a and isobutane/HFC-134a mixed blowing agents have an adequate foam processability in terms of the operable die gap, foam density, cell size and foam cross-sectional size. The cell size tended to decrease slightly as the level of HFC (HFC-134a and HFC-143a) blowing agents in the blowing agent mixture was increased, but the cell sizes of foams expanded with the mixed blowing agents were sufficiently large for a commercial foam.

The foams made with mixed blowing agents had better dimensional stability than those made with solely isobutane as shown in Tables 2b and 2c. The high level of stearyl stearamide improved the dimensional stability of the isobutane-blown foam to the satisfactory level as shown in Table 2b. The foam expanded with mixed blowing agents were almost perfect in dimensional stability.

As shown in Table 2c, compression deteriorated dimensional stability of the foams. Compression had the greatest impact on the isobutane-blown foam. The foam shrank as much as 15 percent when compressed at one hour after extrusion. The foams expanded with the mixed blowing agents performed satisfactorily.

TABLE 2a

| Test No. | Blowing Agent | | | Foaming Temp. (°C.)[4] | Die Gap (mil)[5] | Foam Density | | Cell Size (mm)[8] | Cross-Section | |
|---|---|---|---|---|---|---|---|---|---|---|
| | Type[1] | Ratio (mol)[2] | Level (mph)[3] | | | Fresh[6] pcf (kg/m³) | Aged[7] pcf (kg/m³) | | Width[9] inch (cm) | Thick[10] inch (cm) |
| 2.1* | iC4 | 100 | 0.13 | 111 | 45 | 2.24 (35.8) | 2.17 (34.7) | 1.35 | 1.18 (3.00) | 0.33 (0.84) |
| 2.2 | iC4/R-143a | 75/25 | 0.13 | 110 | 47 | 2.26 (36.2) | 2.20 (35.2) | 1.25 | 1.18 (3.00) | 0.34 (0.86) |
| 2.3 | iC4/R-143a | 50/50 | 0.13 | 108 | 47 | 2.28 (36.5) | 2.18 (34.9) | 1.16 | 1.18 (3.00) | 0.35 (0.89) |
| 2.4 | iC4/R-134a | 75/25 | 0.14 | 106 | 52 | 2.26 (36.2) | 2.06 (33.0) | 1.25 | 1.24 (3.15) | 0.36 (0.91) |
| 2.5 | iC4/R-134a | 50/50 | 0.14 | 105 | 52 | 2.19 (35.0) | (1.94) (31.0) | 1.01 | 1.31 (3.32) | 0.37 (0.94) |

*Not an example of this invention
[1]iC4 = isobutane; R-143a = HFC-143a; R-134a = HFC-134a
[2]Mixture ratio of blowing agent by mole
[3]G-moles of blowing agent mixed in per one hundred grams of polymer
[4]The temperature of foaming gel in degrees Celsius
[5]The height of the die opening in mils
[6, 7]Densities of fresh and aged (2 weeks) foam body in pounds per cubic foot (kilograms per cubic meter (kg/m³))
[8]Cell size in millimeters determined per ASTM D3576
[9, 10]Width and thickness of foam body in inches (centimeters (cm))

TABLE 2b

| Test No. | iC4/HFC Mol Ratio[1] | Foam Volume as a Percentage of the Initial After the Specified Time[2] | | | | | | | | | | | | |
|---|---|---|---|---|---|---|---|---|---|---|---|---|---|---|
| | | 5 min | 15 min | 30 min | 1 hr | 2 hr | 3 hr | 1 day | 2 day | 3 day | 4 day | 5 day | 6 day | 1 wk | 2 wk |
| 2.1* | 100/0 | 98 | 98 | 95 | 94 | 93 | 92 | 92 | 93 | 93 | 95 | 95 | 95 | 95 | 96 |
| 2.2 | 75/25 | 99 | 98 | 98 | 97 | 98 | 98 | 99 | 99 | 100 | 100 | 100 | 100 | 101 | 101 |
| 2.3 | 50/50 | 99 | — | 100 | 99 | 100 | 100 | 101 | 101 | 102 | 100 | 102 | 102 | 102 | 101 |
| 2.4 | 75/25 | 99 | 98 | 99 | 98 | 98 | — | 99 | 100 | 100 | 101 | 101 | 101 | 101 | 101 |

TABLE 2b-continued

| Test No. | iC4/HFC Mol Ratio[1] | Foam Volume as a Percentage of the Initial After the Specified Time[2] | | | | | | | | | | | | |
|---|---|---|---|---|---|---|---|---|---|---|---|---|---|---|
| | | 5 min | 15 min | 30 min | 1 hr | 2 hr | 3 hr | 1 day | 2 day | 3 day | 4 day | 5 day | 6 day | 1 wk | 2 wk |
| 2.5 | 50/50 | 99 | — | 99 | 99 | 99 | — | 100 | 101 | 101 | 102 | 102 | 102 | 102 | 102 |

*Not an example of this invention
[1] The molar ratio of isobutane and HFC-143a (Test 2.2 and 2.3); that of isobutane and HFC-134a (Tests 2.4 and 2.5)
[2] Foam volume as a percentage of the initial determined within 30 seconds after extrusion after aging the specified time TABLE 2c

| Test No. | iC4/HFC Ratio[1] | Foam Volume as a Percentage of the Initial[2] | | | | | | | | | | |
|---|---|---|---|---|---|---|---|---|---|---|---|---|
| | | 5 min | 1 hr | 2 hr | 3 hr | 1 day | 2 day | 3 day | 4 day | 5 day | 6 day | 1 wk | 2 wk |
| | | Compression after 1 hour aging | | | | | | | | | | | |
| 2.1* | 100/0 | 97 | 95 | 93 | 92 | 86 | 85 | 87 | 88 | 88 | 89 | 90 | 94 |
| 2.2 | 75/25 | 97 | 96 | 96 | 96 | 94 | 95 | 96 | 97 | 97 | 98 | 98 | 99 |
| 2.3 | 50/50 | 98 | 98 | 98 | — | 100 | 99 | 99 | 100 | 100 | 100 | 100 | 100 |
| 2.4 | 75/25 | 97 | 96 | 96 | — | 95 | 95 | 96 | 97 | 97 | 97 | 98 | 99 |
| 2.5 | 50/50 | 98 | 98 | 98 | — | 98 | 98 | 98 | 99 | 99 | 99 | 99 | 99 |
| | | Compression after 1 day aging | | | | | | | | | | | |
| 2.1* | 100/0 | 98 | 99 | 99 | — | 94 | 94 | 95 | 95 | 96 | 95 | 96 | 99 |
| 2.2 | 75/25 | 99 | 99 | 99 | — | 98 | 97 | 99 | 99 | 99 | 99 | 99 | 100 |
| 2.3 | 50/50 | 99 | 99 | 99 | — | 99 | 99 | 99 | 99 | 99 | 99 | 98 | 99 |
| 2.4 | 75/25 | 99 | 99 | 99 | — | 98 | 98 | 99 | 99 | 99 | 99 | 99 | 100 |
| 2.5 | 50/50 | 99 | 99 | 99 | — | 98 | 98 | 99 | 99 | 99 | 99 | 99 | 99 |
| | | Compression after 3 days aging | | | | | | | | | | | |
| 2.1* | 100/0 | 100 | 100 | 100 | — | 100 | 100 | 100 | 99 | 99 | 99 | 100 | 100 |
| 2.2 | 75/25 | 100 | 100 | 100 | — | 100 | 100 | 100 | 99 | 100 | 100 | 100 | 100 |
| 2.3 | 50/50 | 100 | 100 | 100 | — | 100 | 99 | 99 | 99 | 99 | 99 | 100 | 100 |
| 2.4 | 75/25 | 99 | 99 | 99 | — | 100 | 100 | 99 | 99 | 99 | 100 | 100 | 100 |
| 2.5 | 50/50 | 100 | 100 | 100 | — | 100 | 99 | 100 | 99 | 99 | 99 | 99 | 99 |
| | | Compression after 1 day aging at 23° F. | | | | | | | | | | | |
| 2.1* | 100/0 | 97 | 98 | 97 | — | 92 | 93 | 94 | 95 | 95 | 95 | 95 | 99 |
| 2.2 | 75/25 | 98 | 99 | 99 | — | 98 | 98 | 99 | 99 | 99 | 99 | 99 | 100 |
| 2.3 | 50/50 | 99 | 99 | 99 | — | 100 | 100 | 100 | 100 | 100 | 99 | 99 | 99 |
| 2.4 | 75/25 | 98 | 99 | 98 | — | 97 | 98 | 99 | 99 | 99 | 99 | 99 | 100 |
| 2.5 | 50/50 | 98 | 99 | 99 | — | 98 | 98 | 98 | 98 | 99 | 98 | 99 | 99 |

*Not an example of this invention
[1] The molar ratio of isobutane and HFC-143a (Tests 2.2 and 2.3); that of isobutane and HFC-134a (Tests 2.4 and 2.5)
[2] The foam volume as a percentage of the initial at the specified time after compression Example 3

The tests of Example 2 were repeated with a more viscous polyethylene. The polyethylene employed in this example had a density of 0.923 g/cm³ and melt index of 0.7 dg/min. A small amount (0.0075 pph) of talcum powder had to be incorporated in order to control the cell size.

The processability and dimensional stability data are presented in Tables 3a, 3b, and 3c. As summarized in Table 3a, the processability of the mixed blowing agents with this viscous polymer was not much different from that of isobutane.

For reasons unknown, this polymer was worse in dimensional stability than one used in Examples 1 and 2.

As seen in Table 3b, the foam expanded with the mixed blowing agent showed significantly improved dimensional stability over foams blown with only isobutane. The dimensional stability of foams expanded with the mixed blowing agents was good.

The stability problem of the foam expanded with isobutane was seen when the foam was compressed. As shown in Table 3c, the foam shrank as much as 36 percent when compressed after one hour aging. The foam stability after compression improved with the foam age, but was not totally satisfactory after 3 days. The foams made with mixed blowing agents performed significantly better.

TABLE 3a

| Test No. | Blowing Agent | | Foaming | | | Foam Density | | Cell Size (mm)[8] | Cross-Section | | Area (cm²)[11] |
|---|---|---|---|---|---|---|---|---|---|---|---|
| | Type[1] | Ratio (mol)[2] | Level (mph)[3] | Temp. (°C.)[4] | Die Gap (mil)[5] | Fresh[6] pcf (kg/m³) | Aged[7] pcf (kg/m³) | | Width[9] inch (cm) | Thick[10] inch (cm) | |
| | | | | PE 300/1.5 pph S-180/0.0075 pph talc | | | | | | | |
| 3.1* | iC4-100 | 100 | 0.13 | 109 | 60 | 2.27 (36.3) | 2.37 (37.9) | 1.47 | 1.30 (3.30) | 0.50 (1.27) | 3.31 |
| 3.2 | iC4/R-143a | 75/25 | 0.13 | 107 | 70 | 2.06 (33.0) | 2.12 (33.9) | 1.35 | 1.38 (3.50) | 0.60 (1.52) | 4.20 |
| 3.3 | iC4/R-143a | 50/50 | 0.13 | 105 | 75 | 2.28 (36.5) | 2.31 (37.0) | 1.35 | 1.33 (3.38) | 0.66 (1.68) | 4.44 |
| 3.4 | iC4/R-134a | 75/25 | 0.13 | 102 | 75 | 2.32 (37.1) | 2.26 (36.2) | 1.35 | 1.27 (3.23) | 0.71 (1.80) | 4.53 |
| 3.5 | iC4/R-134a | 50/50 | 0.14 | 101 | 67 | 2.22 (37.1) | 2.14 | 0.81 | 1.31 | 0.58 | 3.85 |

TABLE 3a-continued

| | Blowing Agent | | Foaming | | Foam Density | | | Cross-Section | | |
| | | | | | Fresh[6] | Aged[7] | | Width[9] | Thick[10] | |
| Test No. | Type[1] | Ratio (mol)[2] | Level (mph)[3] | Temp. (°C.)[4] | Die Gap (mil)[5] | pcf (kg/m$^3$) | pcf (kg/m$^3$) | Cell Size (mm)[8] | inch (cm) | inch (cm) | Area (cm$^2$)[11] |
|---|---|---|---|---|---|---|---|---|---|---|---|
| | | | | | | (35.5) | (34.2) | | (3.33) | (1.47) | |

*Not an example of this invention
[1]iC4 = isobutane; R-143a = HFC-143a; R-134a = HFC-134a
[2]Mixture ratio of blowing agent by mole
[3]G-moles of blowing agent mixed in per one hundred grams of polymer
[4]The temperature of foaming gel in degrees Celsius
[5]The height of the die opening in mils
[6,7]Densities of fresh and aged (2 weeks) foam body in pounds per cubic foot (kilograms per cubic meter (kg/m$^3$))
[8]Cell size in millimeters determined per ASTM D3576
[9,10]Width and thickness of foam body in inches
[11]Area of foam body in square centimeters (centimeters (cm))

TABLE 3b

| Test No. | iC4/HFC Mol Ratio[1] | Foam Volume as a Percentage of the Initial After the Specified Time[2] | | | | | | | | | | | | |
|---|---|---|---|---|---|---|---|---|---|---|---|---|---|---|
| | | 5 min | 15 min | 30 min | 1 hr | 2 hr | 3 hr | 1 day | 2 day | 3 day | 4 day | 5 day | 6 day | 1 wk | 2 wk |
| 3.1* | 100/0 | 98 | 97 | 95 | 94 | 92 | 85 | 85 | 85 | 85 | 85 | 85 | 86 | 86 | 87 |
| 3.2 | 75/25 | 98 | 97 | 95 | 94 | 91 | 91 | 92 | 92 | 92 | 92 | 92 | 93 | 93 | 94 |
| 3.3 | 50/50 | 98 | 97 | 96 | 96 | 96 | 97 | 97 | 97 | 97 | 97 | 97 | 98 | 98 | 98 |
| 3.4 | 75/25 | 98 | 98 | 98 | 97 | 97 | 97 | 97 | 97 | 97 | 98 | 98 | 98 | 98 | 99 |
| 3.5 | 50/50 | 99 | 98 | 98 | 98 | 97 | 98 | 98 | 98 | 98 | 99 | 99 | 99 | 99 | 99 |

*Not an example of this invention
[1]The molar ratio of isobutane and HFC-143a (Test 3.2 and 3.3); that of isobutane and HFC-134a (Tests 3.4 and 3.5)
[2]Foam volume as a percentage of the initial determined within 30 seconds after extrusion after aging the specified time TABLE 3c

| Test No. | iC4/HFC Ratio[1] | Foam Volume as a Percentage of the Initial[2] | | | | | | | | | | |
|---|---|---|---|---|---|---|---|---|---|---|---|---|
| | | 5 min | 1 hr | 2 hr | 3 hr | 1 day | 2 day | 3 day | 4 day | 5 day | 6 day | 1 wk | 2 wk |
| | | Compression after 1 hour aging | | | | | | | | | | | |
| 3.1* | 100/0 | 95 | 91 | 89 | — | 69 | 67 | 66 | 64 | 65 | 66 | 67 | 71 |
| 3.2 | 75/25 | 97 | 92 | 93 | — | 82 | 81 | 81 | 81 | 81 | 82 | 85 | 89 |
| 3.3 | 50/50 | 99 | 94 | 98 | — | 97 | 97 | 97 | 97 | 97 | 98 | 98 | 98 |
| 3.4 | 75/25 | 97 | 96 | 95 | — | 88 | 88 | 88 | 89 | 90 | 91 | 93 | 95 |
| 3.5 | 50/50 | 98 | 98 | — | — | 95 | 96 | 96 | 96 | 97 | 98 | 98 | 99 |
| | | Compression after 1 day aging | | | | | | | | | | | |
| 3.1* | 100/0 | 96 | 96 | 95 | — | 88 | 83 | 81 | 80 | 80 | 80 | 82 | 84 |
| 3.2 | 75/25 | 97 | 97 | 96 | — | 93 | 90 | 89 | 89 | 90 | 91 | 91 | 94 |
| 3.3 | 50/50 | 98 | 98 | 98 | — | 98 | 98 | 97 | 97 | 98 | 98 | 98 | 99 |
| 3.4 | 75/25 | 97 | 97 | 96 | — | 96 | 96 | 92 | 93 | 95 | 96 | 96 | 99 |
| 3.5 | 50/50 | 99 | 99 | 98 | — | 98 | 98 | 97 | 97 | 98 | 99 | 99 | 99 |
| | | Compression after 3 days aging | | | | | | | | | | | |
| 3.1* | 100/0 | 97 | 97 | 97 | — | 92 | 90 | 89 | 87 | 87 | 87 | 87 | 89 |
| 3.2 | 75/25 | 99 | 99 | 98 | — | 96 | 94 | 94 | 94 | 94 | 94 | 94 | 97 |
| 3.3 | 50/50 | 99 | 99 | 99 | — | 99 | 99 | 99 | 99 | 99 | 99 | 99 | 99 |
| 3.4 | 75/25 | 99 | 99 | 99 | — | 97 | 96 | 97 | 98 | 98 | 98 | 98 | 99 |
| 3.5 | 50/50 | 99 | 99 | 100 | — | 99 | 99 | 100 | 99 | 99 | 99 | 99 | 100 |

*Not an example of this invention
[1]The molar ratio of isobutane and HFC-143a (Tests 3.2 and 3.3); that of isobutane and HFC-134a (Tests 3.4 and 3.5)
[2]The foam volume as a percentage of the initial at the specified time after compression

What is claimed is:

1. A process for making an ethylene polymer foam structure, comprising:
    a) heating an ethylene polymer material comprising greater than 50 percent by weight ethylene monomeric units to form a melt polymer material;
    b) incorporating into the melt polymer material at an elevated pressure a blowing agent comprising a primary blowing agent of isobutane and a secondary blowing agent selected from the group consisting of 1,1,1-trifluoroethane, 1,1,1,2-tetrafluoroethane, and a blend of the foregoing to form a foamable gel; and
    c) expanding the foamable gel at a lower pressure to form a foam structure.

2. The process of claim 1, wherein the blowing agent comprises about 5 to about 95 weight percent of the primary blowing agent and about 95 to about 5 weight percent of the secondary blowing agent, the blowing agent weight percentages being based upon the total weight of the blowing agent.

3. The process of 1, wherein the blowing agent comprises about 25 to about 75 weight percent of the primary blowing agent and about 75 to about 25 weight percent of the secondary blowing agent, the blowing agent weight percentages being based upon the total weight of the blowing agent.

4. The process of claim 1, wherein the secondary blowing agent is 1,1,1-trifluoroethane.

5. The process of claim 1, wherein the secondary blowing agent is 1,1,1,2-tetrafluoroethane.

6. The process of claim 1, wherein the ethylene polymer material comprises a polyethylene homopolymer.

7. The process of claim 1, wherein the foam structure further comprises a stability control agent.

* * * * *